United States Patent
Buening et al.

(10) Patent No.: US 6,800,972 B2
(45) Date of Patent: Oct. 5, 2004

(54) GENERATOR AND FAN

(75) Inventors: Duane Joseph Buening, Anderson, IN (US); Michael L. Hull, Anderson, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/354,634

(22) Filed: Jan. 29, 2003

(65) Prior Publication Data

US 2004/0145254 A1 Jul. 29, 2004

(51) Int. Cl.$^7$ ................................................ H02K 1/32
(52) U.S. Cl. ........................ 310/63; 310/62; 310/263; 417/233.1
(58) Field of Search ........................ 310/62, 63, 64, 310/61, 60 R, 58, 52, 263; 417/423.1, 423.7

(56) References Cited

U.S. PATENT DOCUMENTS

| | | | | |
|---|---|---|---|---|
| 4,184,804 A | * | 1/1980 | Inagaki et al. | 415/228 |
| 4,549,103 A | | 10/1985 | Shiga | 310/60 R |
| 4,926,076 A | | 5/1990 | Nimura et al. | 310/68 D |
| 5,144,175 A | * | 9/1992 | Craggs | 310/63 |
| 5,241,230 A | * | 8/1993 | Tanaka et al. | 310/62 |
| 5,594,288 A | * | 1/1997 | Husain | 310/62 |
| 5,625,244 A | * | 4/1997 | Bradfield | 310/232 |
| 6,078,116 A | * | 6/2000 | Shiga et al. | 310/60 R |
| 6,563,247 B2 | | 5/2003 | Nguyen | 310/180 |
| 6,580,187 B2 | | 6/2003 | Bradfield | 310/64 |
| 6,617,717 B2 | * | 9/2003 | Okawa | 310/59 |

* cited by examiner

Primary Examiner—Tran Nguyen
Assistant Examiner—Leda Pham
(74) Attorney, Agent, or Firm—Jimmy L. Funke

(57) ABSTRACT

An improved generator fan serves to draw air into the generator through an inlet in the generator housing, pass the air through the rotor and stator, and direct the air out openings in the generator housing. The fan of the present invention includes a disc and at least one multi-directional blade extending from the disc. The multi-direction blade includes a leading segment extending from the disc between a first radius measured from the axis of rotation and a second radius, the leading segment including a leading edge extending from the disc at an angle of about ninety degrees from the disc, the leading segment extending from the disc with an increasing angle along the length of the leading segment; and a trailing segment extending from the disc between the second radius and a third radius measured from the axis of rotation, the third radius being greater than the second radius and the trailing segment extending from the disc with an angle having a rate of change different than the leading segment.

20 Claims, 4 Drawing Sheets

GENERATOR AND FAN

TECHNICAL FIELD

The present invention relates to an improved generator and fan. More specifically, the invention provides a generator utilizing an improved rotor fan.

BACKGROUND OF THE INVENTION

Without a generator, the electrical load of a vehicle would quickly drain a fully charged battery. In a vehicle, a generator producing alternating current (AC), known as an alternator, is often mounted at the front of the engine and is linked to the engine crankshaft pulley by a drive belt. When the engine turns the drive belt, the drive belt turns a shaft in the alternator, and current is generated. Current is produced in an alternator when a wire intercepts a magnetic field. In an alternator, it is the wire, in coiled form, that is held stationary and the magnetic field is turned so that the magnetic field passes through the wire. Thus, alternators include a stationary part, the stator, and a rotating part, the rotor.

The stator may include stationary coils or slotted pins or segments that surround a rotor. As the rotor is turned by the car engine, the alternating magnetic field created by the rotor is intercepted by the stationary coils, pins or segments, and current flows through the stator first in one direction, then in the other, resulting in alternating current. As the rotor is turned, air flow within the assembly will produce noise in the audible range that will emanate from the alternator assembly.

The rotor includes an electromagnet that is magnetized by current from the battery. The electromagnet may include slip rings, rotor windings, and north and south pole members surrounding the rotor windings. Current from the battery flows through the slip rings to the rotor windings. North and south pole members have pole claws shaped like interlocking teeth surrounding the rotor windings. The north and south pole members create an alternating magnetic field as the rotor turns.

A housing surrounds the rotor and stator assembly. The stator is fixed relative to the housing and the rotor shaft is rotatably mounted relative to the housing. Because the battery and electrical components in the car work on direct current (DC), the AC output of the alternator must be converted to DC. This is done with rectifiers which pass current in one direction only. The components within the alternator produce heat and, in addition, the alternator operates under high under hood temperatures. To reduce the amount of heat in the alternator, a fan is included in the alternator assembly as seen in reference to U.S. Pat. No. 4,549,103 to Shega, entitled Multi-Path Cooling in an AC Generator for a Vehicle.

The fan may be placed inside or outside of the housing to increase airflow between the rotor and stator and to increase airflow through openings in the housing. The fan blades may face inward toward the central portion of the alternator or outward away from the central portion of the alternator. Rotation of the fan helps increase airflow within the alternator and helps to reduce heat within the alternator, but also increases the amount of audible noise emanating from the alternator assembly, an undesirable feature particularly from the point of view of the operator of the vehicle in which the alternator is mounted.

The noise produced by an alternator depends, at least in part, on the design of the alternator fan blades. Alternator fans with straight fan blades having an inside angle of more than ninety degrees from the base of the fan, tend to produce less noise, but undesirably also provide less airflow. Alternator fans with straight fan blades at ninety degrees from the base of the fan produce more airflow, but undesirably more noise. To improve the airflow resulting from a fan with swept out blades, the length of the blade can be increased but this undesirably reduces the number of blades that can be included on a single fan. Other designs have incorporated alternating blades, some blades at ninety degrees and other blades having an inside angle of more than ninety degrees. However, the limitations associated with each type of blade are not entirely overcome by known designs. The present invention overcomes these problems to provide an alternator incorporating an improved fan, resulting in an alternator with reduced noise, improved tonality and improved radial and axial cooling airflow.

SUMMARY OF INVENTION

The present invention provides an improved generator with improved sound quality and reduced noise level, and also provides improved airflow through the generator, improving cooling of the generator components. An improved generator fan serves to draw air into the generator through an inlet in the generator housing, pass the air through the rotor and stator, and direct the air out openings in the generator housing. The fan of the present invention includes a disc adapted to be centrally mounted on a shaft that represents an axis about which the fan rotates.

According to the present invention, at least one multi-directional blade extends from the disc. The multi-direction blade includes a leading segment extending from the disc between a first radius measured from the axis of rotation and a second radius measured from the axis of rotation, the leading segment including a leading edge extending from the disc at an angle of about ninety degrees from the disc, the leading segment extending from the disc with a swept out shape starting at the leading edge and extending from the disc with an increasing angle along the length of the leading segment. A trailing segment extends from the disc between the second radius and a third radius measured from the axis of rotation, the third radius being greater than the second radius and the trailing segment extending from the disc with an angle having a rate of change different than the leading segment.

An improved generator having the inventive fan exhibits improved tonality and a reduced noise level. The resulting generator also provides improved cooling. Other aspects of the present invention are provided with reference to the figures and detailed description of embodiments provided herein.

BRIEF DESCRIPTION OF THE DRAWINGS

The present invention will now be described, by way of example, with reference to the accompanying drawings, in which.

DESCRIPTION OF THE PREFERRED EMBODIMENT

The present invention provides a generator with improved sound quality and reduced noise level, and also provides improved airflow through the generator, improving cooling of the generator components. An improved generator fan serves to draw air into the generator through an inlet in the generator housing, pass the air through the rotor and stator, and direct the air out openings in the generator housing.

Figure 1:
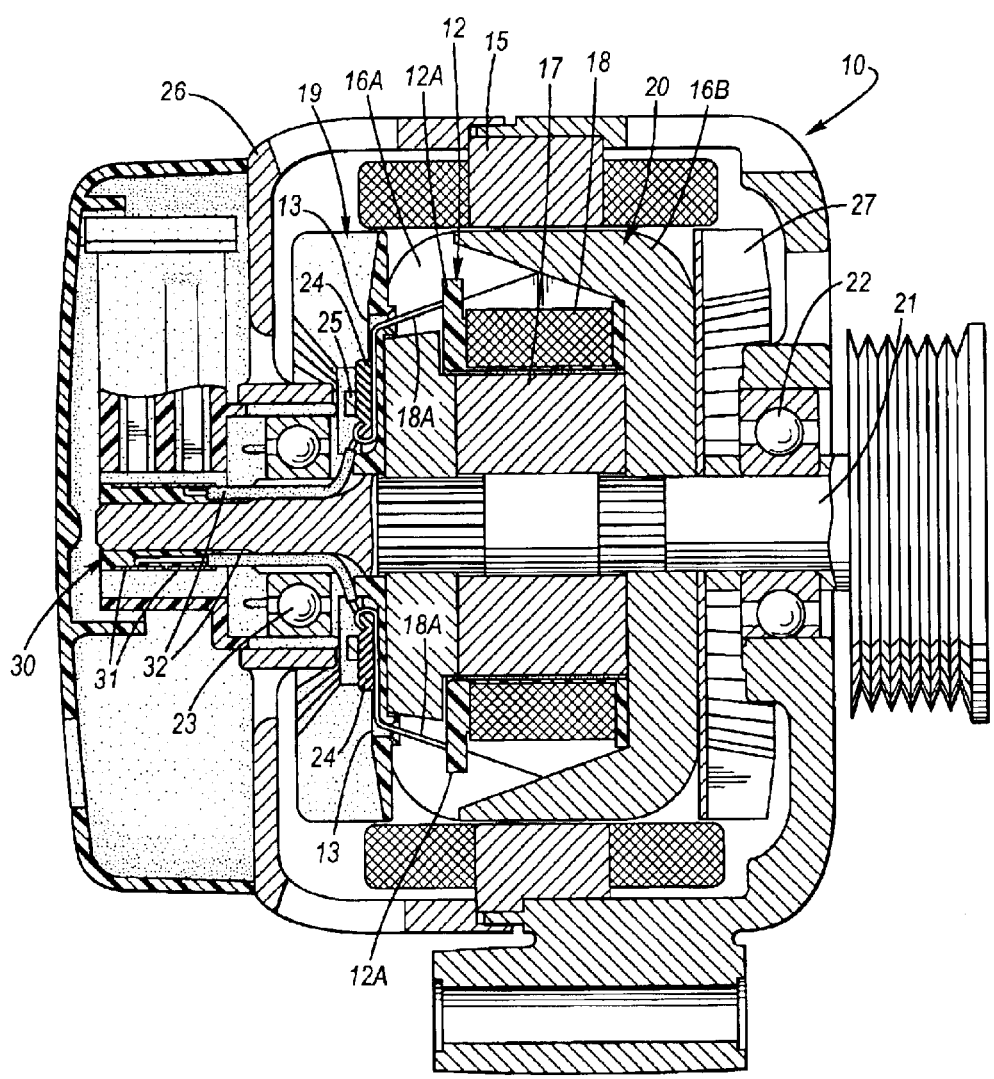
FIG. 1 is a cross-sectional view of an exemplary generator.

FIG. 1 illustrates an example of an exemplary generator 10 in which the improved fan of the present invention may be used. The exemplary generator includes a stator assembly 15 surrounding a rotor assembly 20. The rotor assembly 20 includes a shaft 21 supporting all rotating magnetic structures including conventional pole-members 16A and 16B, a rotor core 17 and a field coil 18 wound upon bobbin 12. Additionally, all other non-magnetic circuit rotating structures are carried, including air circulation fans 19 and 27 located at axially opposite sides of the pole-members, and a slip ring assembly 30 located at one extreme end of the shaft 21. The fan 27 is formed from sheet metal stock and spot welded to the pole-member 16B while fan 19 is formed from an appropriate thermoplastic material and heat staked to tower extensions (not shown) from the field coil bobbin 12. The shaft 21 is rotatably supported within a housing 26 by a pair of bearings 23 and 22. Bearing 23 is located between the slip ring assembly 30 and the fan 19. Coil leads 18A of field coil 18 are wrapped about respective posts 12A of bobbin 12 and pass through holes 13 in fan 19. Slip ring assembly 30 is made of a pair of copper rings 31 each having a slip ring lead 32 joined such as by welding thereto. The copper rings and wires are molded into a thermoset material to complete the slip ring assembly 30. Slip ring assembly 30 is pressed onto the end of rotor shaft 21 and the slip ring leads 32 are routed into channels along the shaft 21 where they are joined, such as by twisting and welding, to the coil leads 18A of field coil 18 via a joint 24. The joint 24 is then bent to the surface of the fan 19 and received in a pyramid shaped tab structure 25. The joint 24 is then secured to fan 19 by ultrasonic welding of the plastic material of the tab 25. Bearing 23 is assembled to pass over the slip ring assembly 30 to retain the lead wires 32 securely within the shaft channels. Preferably, fan 27 of FIG. 1 is replaced by the improved fan described with respect to FIGS. 2–7. Other applications of the inventive fan are possible and remain within the spirit and scope of the invention. Various embodiments of the present invention are described herein.

Figure 2:
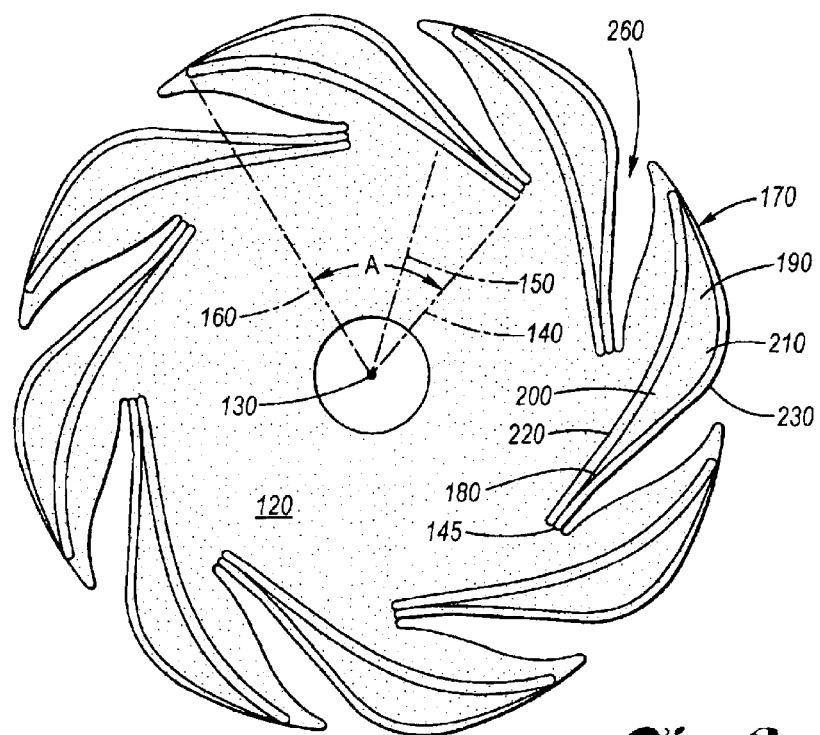
FIG. 2 illustrates a front view of an embodiment of an improved generator fan.

FIG. 2 illustrates a front view of an embodiment of an improved generator fan 110. The generator fan 110 of this embodiment is suitable for use in an alternator such as would be used in an automobile and may be replace either of fan 19 or fan 27, or both fan 19 and fan 27, in the exemplary generator of FIG. 1. The fan 110 of the present invention provides both axial and radial airflow. The fan 110 includes a disc 120 adapted to be mounted on a rotor shaft having an axis 130 of rotation that the fan 110 rotates about. According to the present invention, at least one multi-directional blade 170 extends from the disc 120. With respect to a clockwise direction of rotation in this view, the multi-direction blade includes a leading segment 180. The leading segment 180 is defined as the portion of multi-directional blade 170 extending from the disc 120 between a first radius 140 measured from the axis 130 of rotation and a second radius 150 measured from the axis 130 of rotation, the second radius 150 being greater than the first. The leading segment 180 extends from the disc 120 with a swept out angle starting at a leading edge having an angle of ninety degrees at the first radius and increasing along the length of the leading segment 180. The trailing segment 190 is defined as the portion of multi-directional blade 170 that extends from the disc 120 between the second radius 150 and a third radius 160 measured from the axis 130 of rotation, the third radius 160 being greater than the second radius 150. The trailing segment 190 differs from the leading segment 180 in that the trailing segment extends from the disc 120 at an angle having a rate of change different from the leading segment 180. According to one embodiment, the trailing segment 190 extends from the disc 120 at a fixed angle. The amount of radial and axial flow can be adjusted by tailoring the rate of change of the angle of the trailing segment 190 to provide the desired amount of flow in each direction. Flow directed radially will have greater interaction with the stator. Flow directed axially will have greater interaction with the rotor. The improved fan 110 provides increased flow rates at the same time reducing noise and improving tonality. The improved fan 110 may be formed from any of a variety of metals including without limitation steel. The fan 110 of this embodiment can be formed by a punched metal process in which the entire fan 110 is formed from a single metal piece. In an alternative embodiment, the fan 110 may be of a molded material including without limitation polymer materials. The improved fan 110 provides increased flow rates at the same time reducing noise and improving tonality.

FIG. 2 further illustrates an embodiment in which the base portion 200 of the blade has an arced interface 220 with the disc 120. The fan 110 may additionally include flow apertures 260 between the multi-directional blade 170 and an adjacent blade. This improves airflow on both sides of the fan 110 and helps to eliminate flow blockage.

According to the embodiment shown in FIG. 2, the fan 110 may include a plurality of overlapping multi-directional blades 170. According to the invention, the first radius 140 is defined to be less than the second radius 150 and the second radius 150 less than the third radius 160, as a result, the plurality of multi-directional blades 170 may overlap one another so that the leading segment 180 of each multi-directional blade 170 begins proximal the second radius 150 of an adjacent multi-directional blade 170. This allows for an increased number of blades on the disc 120 and allows for blades having increased length each providing increased airflow. The first radius 140 and third radius 160 define a central blade angle A of about eighty degrees, and the fan 110 includes eight overlapping multi-directional blades 170 distributed around the disc 120. According to one embodiment, the multi-directional blades 170 are uniformly distributed about the disc 120. According to one embodiment, the multi-directional blades 170 are non-uniformly distributed around the disc 120 to reduce the level of noise created by the airflow. According to one embodiment, angle A varies from multi-directional blade 170 to multi-directional blade 170 on the same disc 120 to further decrease the level of noise created by the airflow.

According to one embodiment, the upper portion 210 of the multi-directional blade 170 terminates in an outer edge 230 defined by the outermost portion of the leading segment 180 and trailing segment 190, gradually increases in distance from the disc 120 as the leading segment 180 extends from the first radius 140 to the second radius 150 and gradually decreases in distance from the disc 120 as the trailing segment 190 extends from the second radius 150 to the third radius 160.

According to one embodiment, the leading section 180 sweeps from the angle of about ninety degrees at the leading edge to an angle of about one hundred twenty degrees where the leading segment 180 meets the trailing segment 190. This improves the flow rate in both the axial and radial direction by increasing the mount of air drawn in by the fan 110 while reducing noise level. According to one embodiment, the trailing segment extends from the disc 120 at an angle of about one hundred twenty degrees to provide the desired ratio of radial flow and axial flow of air to cool the generator. According to one embodiment, the trailing segment 190 extends from the disc at an angle greater than about one hundred twenty degrees, increasing the amount of axial airflow through the generator.

Figure 3:
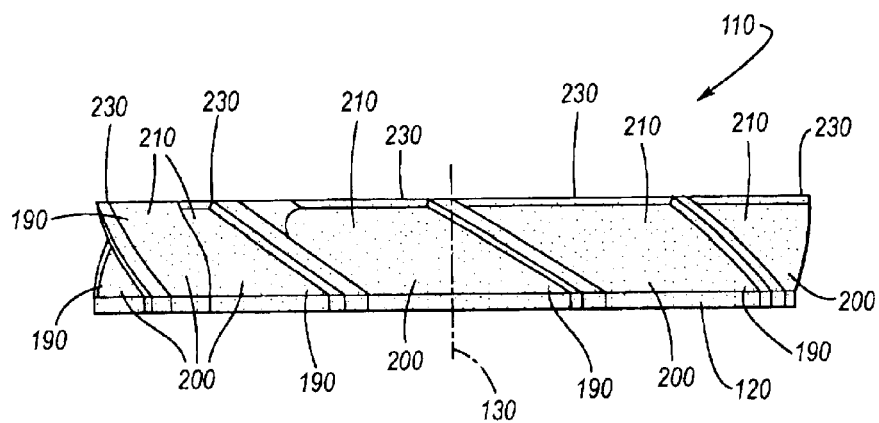
FIG. 3 illustrates a side view of an embodiment of an improved generator fan.

FIG. 3 is a side view of an embodiment of the improved generator fan 110 showing the multi-directional blades 170 overlapping one another. As seen in this view, the trailing segments 190 overlap the leading segments 180. The overlapping multi-directional blades 170 provide better axial airflow than known generator fans having only blades uniformly tilted inward. The noise level is decreased in part due to less airflow interaction with the stator. The overlapping multi-directional blades 170 also provide smoother inlet and outlet airflow as the air passes in and out of the generator. Flow apertures 260 between the overlapping multi-directional blade 170 improve airflow on both sides of the fan 110 and help to eliminate flow blockage.

Figure 4:
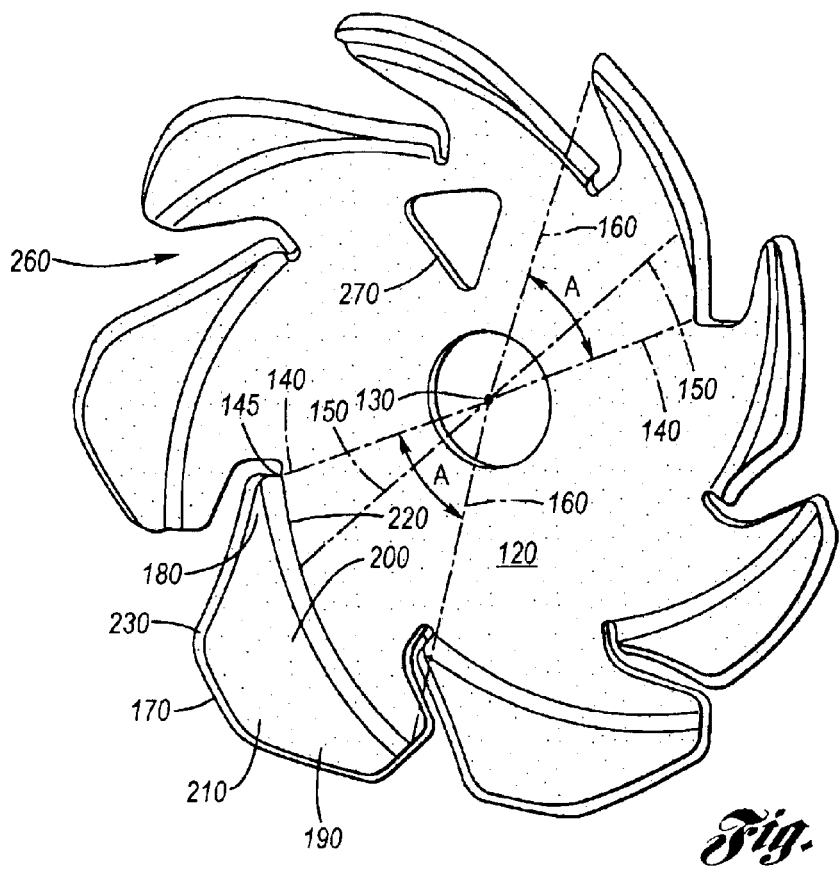
FIG. 4 illustrates an isometric view of an embodiment of an improved generator fan.

FIG. 4 illustrates an isometric view of an embodiment of the improved generator fan 110 utilizing a multi-directional blade 170 to provide both axial and radial airflow to a generator. The fan 110 includes a disc 120 adapted to be mounted on a generator shaft or rotor shaft and at least one multi-directional blade 170 extending from the disc 120. In this embodiment, at least one port 270 is included in the disc 120 to dynamically balance the fan. In this embodiment, the flow apertures between the multi-directional blades are enlarged relative to the flow apertures shown in FIG. 2. According to one embodiment, the leading section 180 sweeps from the angle of about ninety degrees at the leading edge to an angle of about one hundred twenty degrees where the leading segment 180 meets the trailing segment 190. This improves the flow rate in both the axial and radial direction by increasing the mount of air drawn in by the fan 110 while reducing noise level. According to one embodiment, the trailing segment extends from the disc 120 at an angle of about one hundred twenty degrees to provide the desired ratio of radial flow and axial flow of air to cool the generator. According to one embodiment, the trailing segment 190 extends from the disc at an angle greater than about one hundred twenty degrees, increasing the amount of axial airflow through the generator.

Figure 5:
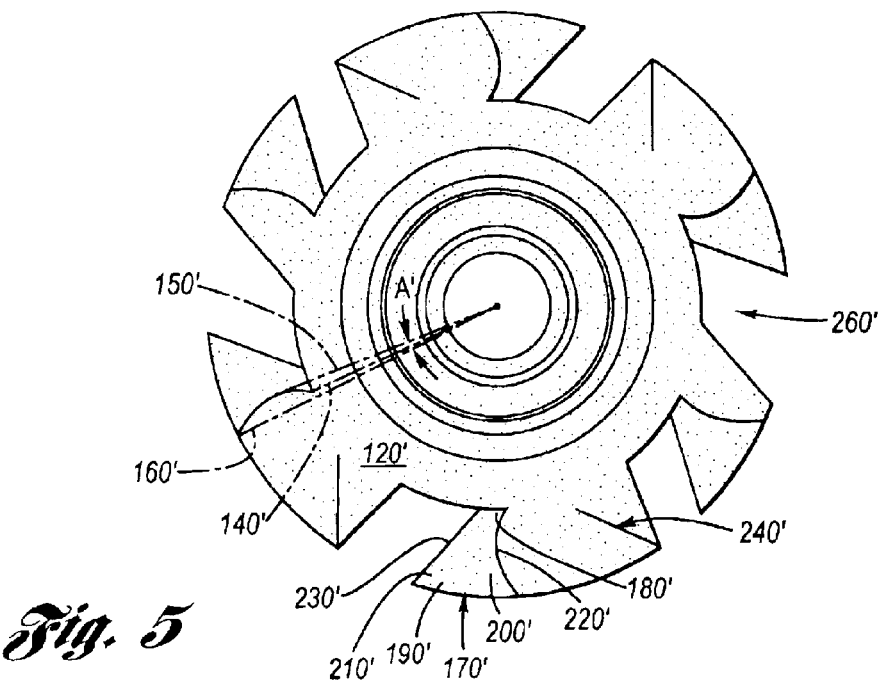
FIG. 5 illustrates a front view of an embodiment of an improved generator fan.

FIG. 5 illustrates a front view of an embodiment of the improved generator fan 110'. The generator fan 110' of this embodiment may be used in an alternator such as would be used in an automobile and may be used in place of fan 19 or fan 27, or both fan 19 and fan 27, in the exemplary generator of FIG. 1. The fan 110' of the present invention provides both axial and radial airflow. The fan 110' includes a disc 120' adapted to be centrally mounted on a rotor shaft which represents an axis 130' of rotation that the fan 110' rotates about. According to the present invention, at least one multi-directional blade 170' extends from the disc 120'. The multi-direction blade includes a leading segment 180' extending from the disc 120' between a first radius 140' measured from the axis 130' of rotation and a second radius 150' measured from the axis 130' of rotation, the second radius 150' being greater than the first. The leading segment 180' extends from the disc 120' at an angle of about ninety degrees from the disc 120'. The trailing segment 190' extends from the disc 120' between the second radius 150' and a third radius 160' measured from the axis 130' of rotation, the third radius 160' being greater than the second radius 150'. The trailing segment 190' extends from the disc 120' at an angle having a rate of change different than the leading segment 180'. The amount of radial and axial flow can be adjusted by tailoring the angle of the trailing segment 190' to provide the desired amount of flow in each direction. Flow directed radially will have greater interaction with the stator. Flow directed axially will have greater interaction with the rotor. The improved fan 110' provides increased flow rates at the same time reducing noise levels and improving tonality.

In this embodiment, the multi-directional blade 170' is combined with at least one straight blade 240' having a substantially planar shape and a straight interface 250' with the disc 120'. The straight blade 240' has a uniform angle from the disc 120' along the entire length of the blade. Thus, the amount of radial and axial flow can be further adjusted by tailoring the angle of the straight blade 240' to provide the desired amount in combination with the affect of the multi-directional blade 170'. The straight blade 240' may be defined by a straight angle of ninety degrees, less than ninety degrees, or more than ninety degrees. Further, various combinations of straight and tilted blades may be incorporated into the improved fan 110'.

According to one embodiment, at least one flow port 260' is included in the fan 110' between the multi-directional blade 170' and an adjacent blade. This improves airflow on both sides of the fan 110'. According to one embodiment, the fan 110' includes six multi-directional blades 170' and four uniform blades.

According to one embodiment, the leading section 180' sweeps from the angle of about ninety degrees at the leading edge to an angle of about one hundred twenty degrees where the leading segment 180' meets the trailing segment 190'. This improves the flow rate in both the axial and radial direction by increasing the mount of air drawn in by the fan 110' while reducing noise level. According to one embodiment, the trailing segment extends from the disc 120' at an angle of about one hundred twenty degrees to provide the desired ratio of radial flow and axial flow of air to cool the generator. According to one embodiment, the trailing segment 190' extends from the disc at an angle greater than about one hundred twenty degrees, increasing the amount of axial airflow through the generator.

Figure 6:
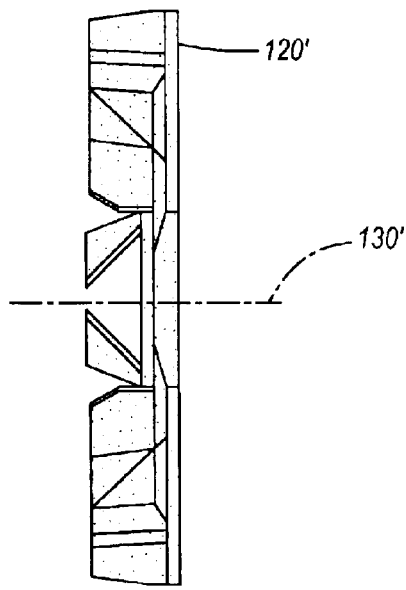
FIG. 6 illustrates a side view of an embodiment of an improved generator fan.

In the embodiment of FIG. 5, an outer edge 230', defined by the outermost portion of the upper portion 210' of the leading segment 180' and trailing segment 190' has a substantially constant distance from the disc 120' providing a blade with a substantially uniform height along the length of the blade. FIG. 6 is a side view of the improved generator fan 110' of FIG. 5.

Figure 7:
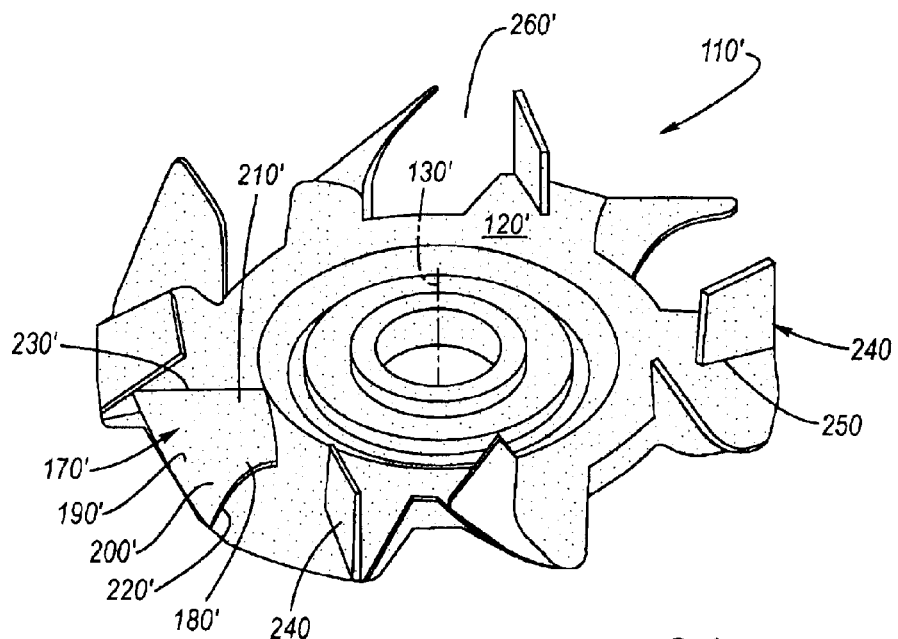
FIG. 7 illustrates an isometric view of an embodiment of an improved generator fan.

FIG. 7 illustrates an isometric view of an improved generator fan 110' utilizing a multi-directional blade 170' to provide both axial and radial airflow to a generator. The fan 110' includes a disc 120' adapted to be mounted on a generator shaft and at least one multi-directional blade 170' extending from the disc 120'. As seen in this view, the base of the multi-directional blade may have an arced interface 220' with the disc 120'. According to one embodiment of the invention, the angle between the second radius 150' and third radius 160' is defined as a central blade angle A' of about 8 degrees and the blades are distributed on the disc 120' without overlapping an adjacent blade. According to one embodiment, the fan 110' includes six multi-directional blades 170' and four uniform blades distributed on the disc 120'.

The improved fan described herein can be mounted axially inward of the housing with the blades extending outward. In an alternative embodiment, the fan can be mounted axially outward of the housing with the blades extending axially inward. More than one fan 10 may be employed in a single generator.

The invention provided herein allows more flexibility to tune a fan 110 design to provide airflow for a given application according to the desired noise level, tonality, axial airflow and radial airflow. While the present invention has been described with reference to exemplary embodiments, a variety of embodiments may be produced utilizing the apparatus and process described herein. Modifications and variations in the invention will be apparent to those skilled in the art in light of the foregoing description. It is therefore contemplated that the appended claims and their equivalents will embrace any such alternatives, modifications and variations as falling within the scope of the present invention.

What is claimed is:

1. A generator fan, comprising:
   a disc adapted to be centrally mounted perpendicular to an axis of rotation and at least one multi-directional blade extending from the disc, the multi-directional blade including:
   a leading segment extending from the disc between a first radius measured from the axis of rotation and a second radius measured from the axis of rotation, the leading segment including a leading edge extending from the disc at an angle of about ninety degrees from the disc, the leading segment extending from the disc with a swept out shape starting at the leading edge and extending from the disc with an increasing angle along the length of the leading segment; and
   a trailing segment extending from the disc between the second radius and a third radius measured from the axis of rotation, the third radius being greater than the second radius and the trailing segment extending from the disc with an angle having a rate of change different than the leading segment.

2. The generator fan of claim 1, wherein the trailing segment further extends from the disc at a substantially fixed angle.

3. The generator fan of claim 1, wherein the multi-directional blade further includes an arced interface with the disc.

4. The generator fan of claim 1, further comprising:
   a flow port between the multi-directional blade and an adjacent blade.

5. A generator fan, comprising:
   a disc adapted to be centrally mounted perpendicular to an axis of rotation and at least one multi-directional blade extending from the disc, the multi-directional blade including:
   a leading segment extending from the disc between a first radius measured from the axis of rotation and a second radius measured from the axis of rotation, the leading segment including a leading edge extending from the disc at an angle of about ninety degrees from the disc, the leading segment extending from the disc with a swept out shape starting at the leading edge and extending from the disc with an increasing angle along the length of the leading segment; and
   a trailing segment extending from the disc between the second radius and a third radius measured from the axis of rotation, the third radius being greater than the second radius and the trailing segment extending from the disc with an angle having a rate of change different than the leading segment;
   wherein the leading segment sweeps from the angle of about ninety degrees at the leading edge to an angle of about one hundred twenty degrees where the leading segment meets the trailing segment and wherein the trailing segment extends from the disc at an angle of about one hundred twenty degrees.

6. The generator fan of claim 1, wherein the multi-directional blades overlap one another so that the leading segment begins proximal the second radius of an adjacent multi-directional blade.

7. The generator fan of claim 6, wherein the first and third radius define a central blade angle A of about eighty degrees.

8. The generator fan of claim 7, further comprising:
   about eight multi-directional blades distributed non-uniformly around the axis of rotation.

9. The generator fan of claim 1, further comprising:
   at least one uniform blade having a uniform angle from the disc.

10. The generator fan of claim 9, wherein the uniform angle is about ninety degrees or more.

11. The generator fan of claim 9, wherein the uniform angle is less than ninety degrees.

12. The generator fan of claim 9, wherein the uniform blade has a straight interface with the disc.

13. The generator fan of claim 9, further comprising:
   an outer edge defined by the outermost portion of the leading segment and trailing segment, the outer edge having a fixed distance from the disc.

14. The generator fan of claim 9, wherein the first and third radius define a central blade angle A' of about eight degrees and the blades are distributed on the disc without overlapping an adjacent blade.

15. The generator fan of claim 9, wherein the fan includes six multi-directional blades and four uniform blades distributed on the disc.

16. A generator comprising:
   a generator shaft defining an axis of rotation;
   a fan including a disc mounted on the shaft and at least one multi-directional blade extending from the disc, the multi-directional blade including:
   a leading segment extending from the disc between a first radius measured from the axis of rotation and a second radius measured from the axis of rotation, the leading segment including a leading edge extending from the disc at an angle of about ninety degrees from the disc, the leading segment extending from the disc with a swept out shape starting at the leading edge and extending from the disc with an increasing angle along the length of the leading segment; and
   a trailing segment extending from the disc between the second radius and a third radius measured from the axis of rotation, the third radius being greater than the second radius and the trailing segment extending from the disc with an angle having a rate of change different than the leading segment.

17. The generator of claim 16, further comprising:
   the trailing segment extending from the disc at a uniform angle.

18. A generator comprising:

a generator shaft defining an axis of rotation;

a fan including a disc mounted on the shaft and at least one multi-directional blade extending from the disc, the multi-directional blade including:

a leading segment extending from the disc between a first radius measured from the axis of rotation and a second radius measured from the axis of rotation, the leading segment including a leading edge extending from the disc at an angle of about ninety degrees from the disc, the leading segment extending from the disc with a swept out share starting at the leading edge and extending from the disc with an increasing angle along the length of the leading segment; and a trailing segment extending from the disc between the second radius and a third radius measured from the axis of rotation, the third radius being greater than the second radius and the trailing segment extending from the disc with an angle having a rate of change different than the leading segment, wherein the leading segment sweeps from the angle of about ninety degrees at the leading edge to an angle of about one hundred twenty degrees where the leading segment meets the trailing segment and wherein the trailing segment extends from the disc at an angle of about one hundred twenty degrees.

19. The generator of claim 16, further comprising:

the multi-directional blade having an arced interface with the disc.

20. The generator of claim 16, further comprising:

a flow port between the multi-directional blade and an adjacent blade.

* * * * *